(12) United States Patent
Murray

(10) Patent No.: US 9,512,626 B1
(45) Date of Patent: *Dec. 6, 2016

(54) METHODS AND APPARATUS FOR DRYWALL TOOLS

(71) Applicant: Exceptional IP Holdings, LLC, Cary, NC (US)

(72) Inventor: Scott A. Murray, Lenexa, KS (US)

(73) Assignee: Exceptional IP Holdings, LLC

( * ) Notice: Subject to any disclaimer, the term of this patent is extended or adjusted under 35 U.S.C. 154(b) by 305 days.

This patent is subject to a terminal disclaimer.

(21) Appl. No.: 14/016,130

(22) Filed: Sep. 1, 2013

Related U.S. Application Data

(63) Continuation of application No. 10/937,561, filed on Sep. 10, 2004, now Pat. No. 8,523,467.

(60) Provisional application No. 60/502,288, filed on Sep. 12, 2003, provisional application No. 60/527,515, filed on Dec. 8, 2003.

(51) Int. Cl.
*E04F 21/16* (2006.01)
*E04F 21/165* (2006.01)
*B29C 59/02* (2006.01)

(52) U.S. Cl.
CPC ............. *E04F 21/165* (2013.01); *B29C 59/02* (2013.01)

(58) Field of Classification Search
CPC ................................. E04F 21/08; E04F 21/165
USPC .......................................................... 401/48
See application file for complete search history.

(56) References Cited

U.S. PATENT DOCUMENTS

| | | | | |
|---|---|---|---|---|
| 2,809,513 A * | 10/1957 | Ames | ............................. | 401/261 |
| 2,984,857 A * | 5/1961 | Ames | ............................... | 401/5 |
| 3,103,033 A * | 9/1963 | Ames | ..................... | E04F 21/08 401/171 |
| 3,451,757 A * | 6/1969 | Vaughan | ................. | E04F 21/08 401/139 |
| 3,602,405 A * | 8/1971 | Ames | .................... | E04F 21/165 401/261 |
| 4,132,517 A * | 1/1979 | Ames | ...................... | E04F 21/00 401/48 |
| 5,137,386 A * | 8/1992 | Mower | ................. | E04F 21/165 401/171 |
| 5,143,264 A * | 9/1992 | MacMillan | ........... | E04F 21/165 401/48 |
| 6,146,039 A * | 11/2000 | Pool et al. | ............ | E04F 21/165 401/48 |
| 8,231,371 B1 * | 7/2012 | Jalbert | .................. | E04F 21/165 401/263 |
| 2002/0074361 A1 * | 6/2002 | Trout | ...................... | E04F 21/08 222/386 |
| 2002/0102416 A1 * | 8/2002 | Mayzel | ......................... | 428/447 |

OTHER PUBLICATIONS

"Superplastic Magnesium Alloys for Sporting and Leisure Equipments", Materials and Science in Sports, Proceedings of a Symposium, Coronado, CA, US, Apr. 22-25, 2001, Tan, J. C.; Tan, M. J.*

* cited by examiner

*Primary Examiner* — Jennifer C Chiang
*Assistant Examiner* — Bradley Oliver
(74) *Attorney, Agent, or Firm* — Wolff Law Offices, PLLC; Kevin Alan Wolff

(57) ABSTRACT

The present invention is directed generally to building tools that are high quality, durable, and in some case lightweight. For example, a mastic flat box may made by forming multiple sections into a single integrated piece by, for example, an extrusion process so as to reduce manufacturing cost and increase the structural durability of the tool. The mastic flat box may be made in such a way as to allow for easier assembly, operation, and cleaning. Further, mastic flat box may be made, at least in part, using a material including magnesium to reduce the weight of the tool. Still further, mastic flat box may be made using one or more protective coatings for protecting various metals against corrosion, for example, using a high impact coating such as paint covered with a clear coat of lacquer.

18 Claims, 12 Drawing Sheets

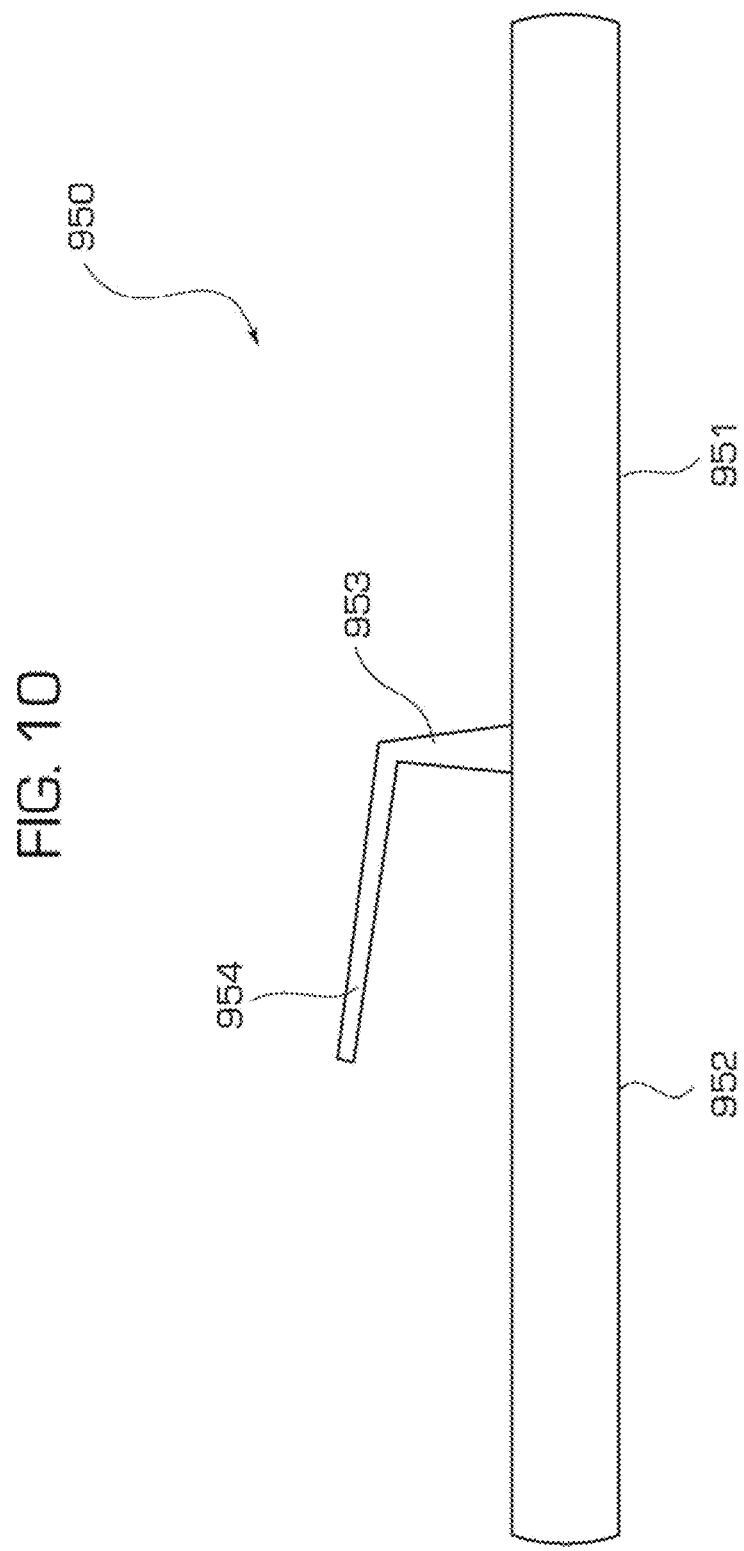

METHODS AND APPARATUS FOR DRYWALL TOOLS

This application is a continuation of U.S. patent application Ser. No. 10/937,561, filed Sep. 10, 2004, and claims the benefit of U.S. Provisional Application No. 60/502,288, filed Sep. 12, 2003, and 60/527,515, filed Dec. 8, 2003, the entire disclosures of which are hereby incorporated by reference as if set forth fully herein.

FIELD OF THE INVENTION

The present invention pertains to methods and various apparatuses for building tools. For example, the invention involves methods and various apparatuses for high quality, durable and in some cases lightweight building tools.

BACKGROUND

Various tools have been known in the past for working with cements, concretes, mastics and/or muds to, for example, prepare, apply and finish a desired shape or smooth surface for various building surfaces. For example, some tools used for preparing the surface of, for example, concrete, include trowels. Another example are various tools used to prepare and finish, for example, mastics and mud for drywall, including corner finishing boxes, joint boxes, and automatic taper machines. In any case, these types of tools are typically hand tools that are used to apply and/or smooth various building surfaces such as floors and walls and result in skilled craftsman working on a number of surfaces for long periods of time during the work day. These types of tools are also exposed to bumps and mechanical stresses as well as corrosive substances in their use. Therefore, it is advantageous to build such tools to be cost effective, light in weight and durable against extensive use and stress as well as the corrosion from corrosive materials they are designed to work on (e.g., concrete, mastic, mud, etc.).

SUMMARY

The present invention is directed generally to building tools that are high quality, durable, and in some cases lightweight. For example, various tools may made by forming multiple sections into a single integrated piece by, for example, casting the parts using a molding process so as to reduce manufacturing cost and increase the structural durability of the tool. Further, various tools may be made, at least in part, using a material including magnesium to reduce the weight of the tool. Still further, various tools may be made using one or more protective coatings for protecting various metals against corrosion, for example, using a high impact coating such as paint covered with a clear coat of lacquer.

In one embodiment, a flat box may include a housing or container for holding mastic or mud and may be formed in most part from a single molded metal container. A movable pressure plate is placed in a first opening of the housing or container so as to provide a mechanism for pushing mastic or mud place in the container out an output hole of the container or housing so as to apply the mastic or mud in a controlled manner to a building surface. A back plate may complete the ridged structure of the housing or container and may be attached to the housing or container by, for example, welding. The back plate may be made as a single flat plate having a relatively short width so as to allow the movable pressure plate to open sufficiently wide to allow residual mastic or mud to be removed from the inside of the housing or container (i.e., to easily clean out residual mastic or mud after use) without the need for removing the pressure plate or removing various sides of the container or housing. The housing or container, pressure plate, and/or various other parts of the flat box may be made of metal including, for example, aluminum so as to make the flat box light weight. In one variation, the housing, pressure plate, and/or various other parts of the flat box may be coated with a high impact coating and/or a lacquer, for example a high impact lacquer paint so as to provide a corrosion resistant coating. In another variation, the housing or container, pressure plate, and/or various other parts of the flat box may be made of metal including, for example, magnesium so as to make the flat box even lighter weight. In this case, larger housings or containers having a higher volume capacity may be made without becoming too heavy for a typical user or tradesman.

In another embodiment, an angle or corner applicator may include a housing or container for holding mastic or mud and may be formed, in most part, from a single molded metal container. A movable pressure plate may be placed in a first opening of the housing or container so as to provide a mechanism for pushing mastic or mud place in the container out an output hole or opening of the container or housing so as to apply the mastic or mud in a controlled manner to a building surface. The movable pressure plate may be attached to the housing or container. The housing or container and/or various other parts of the angle or corner applicator may be made of a metal including, for example, aluminum so as to make angle or corner applicator light weight. In one variation, the housing or container and/or various other parts of the angle or corner applicator may be coated with a high impact coating and/or a lacquer, for example a high impact lacquer paint so as to provide a corrosion resistant coating. In another variation, the housing or container, pressure plate, and/or various other parts of the angle or corner applicator may be made of metal including, for example, magnesium so as to make the angle or corner applicator even lighter weight. In this case, larger housings or containers having a higher volume capacity may be made without becoming too heavy for a typical user or tradesman.

In a further embodiment, an automatic taper may include a control tube coated with a high impact coating and/or a lacquer, for example a high impact lacquer paint, so as to provide a corrosion resistant coating.

In a further embodiment, a trowel includes a tang, support member or attachment member that may be made, at least in part, of a magnesium material so as to create a more light weight trowel. The tang, support member or attachment member connects the trowel handle to the trowel blade. The trowel may be, for example, a concrete trowel including a cross-ground trowel, a flat back end finishing trowel, or a round/round finishing trowel.

BRIEF DESCRIPTION OF THE DRAWINGS

The objects, features and advantages of the present invention will become more readily apparent to those skilled in the art upon reading the following detailed description, in conjunction with the appended drawings, in which:

FIG. 10 illustrates one exemplary tang, support member, or attachment member for the trowel of FIGS. 9A-9C, according to one embodiment of the invention.

DETAILED DESCRIPTION

Figure 1A:
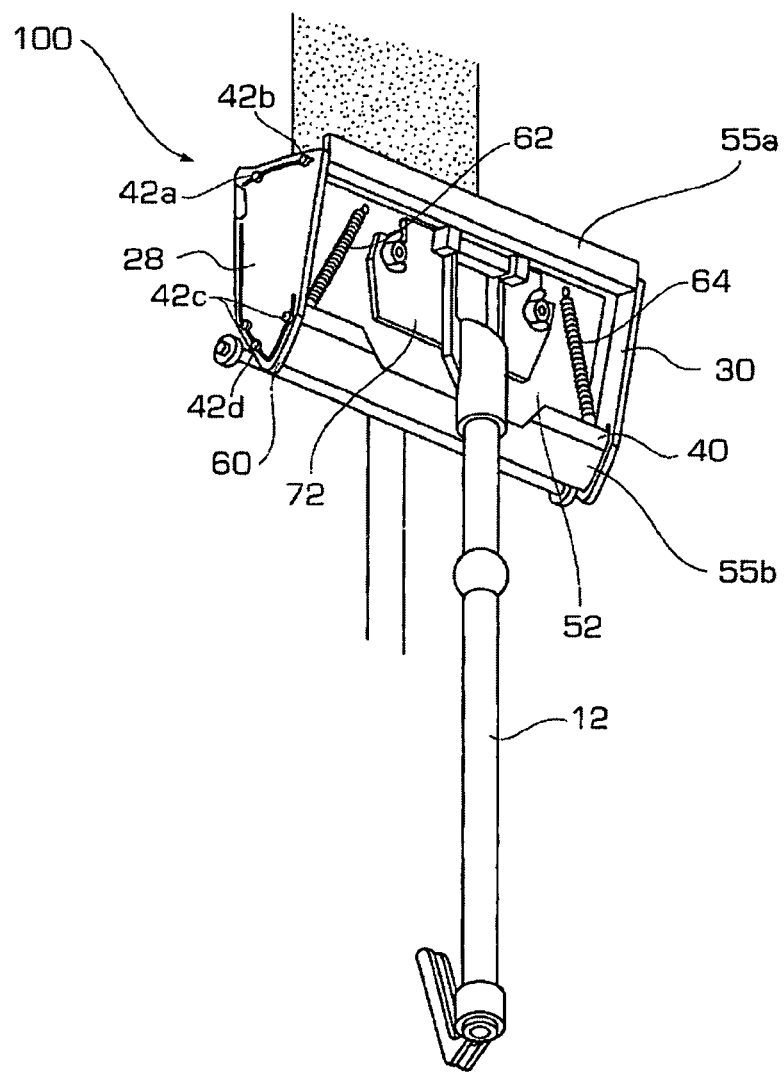
FIGS. 1A-1D depict a first traditional flat box construction.
Figure 1B:
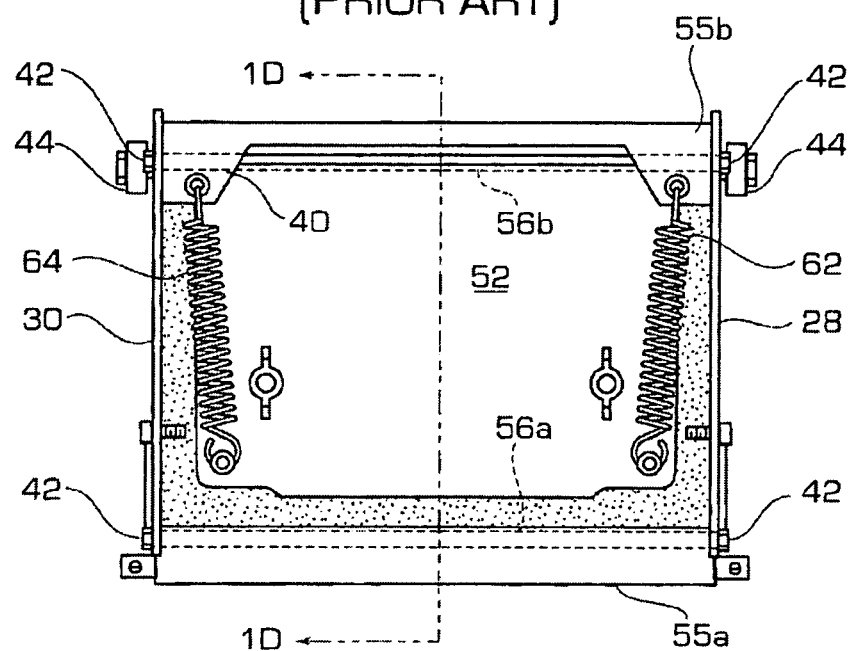
Figure 1C:
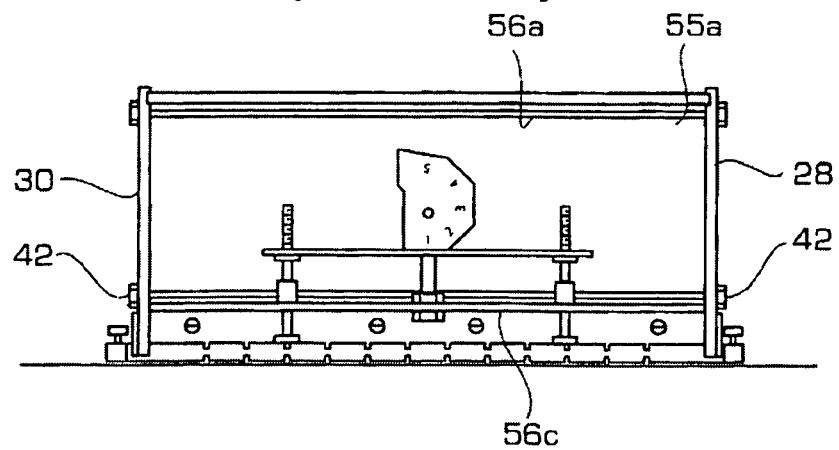
Figure 1D:
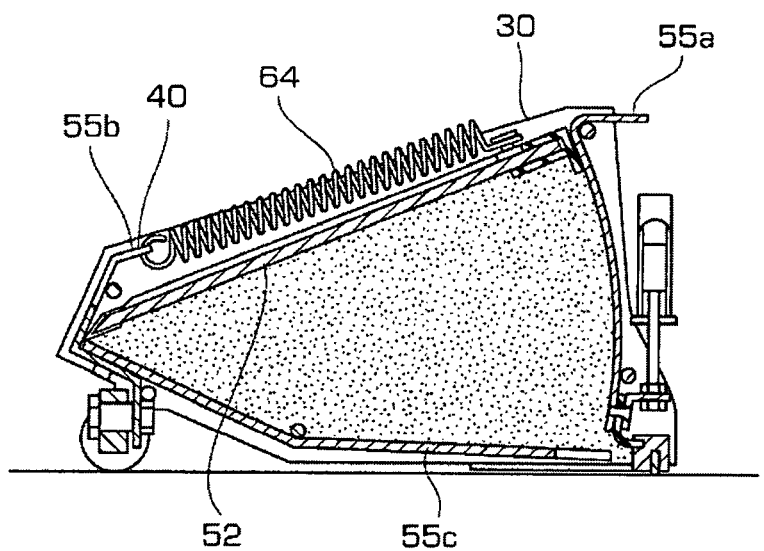

The present invention is directed generally to building tools that are high quality, durable, and in some cases lightweight. As such, the present invention includes various embodiments showing methods and various apparatuses for working with mastic or mud and/or finishing drywall. One embodiment is directed to a flat box applicator typically used for applying mastic or mud to complete drywall.

Referring to FIGS. 1A, 1B, 1C, and 1D a first type of typical flat box applicator is shown. Some examples may be found in U.S. Pat. Nos. 2,824,442; 2,984,857; 3,888,611; and 4,516,868, among others. In particular, the flat box applicator 100 is made in the form of a container or housing 60. The housing may have three separate sides 55a, 55b, and 55c, forming three sides of a six sided container or housing 60. A first side 55a is bent to form a front lip and front plate. A second side portion 55b is bent into a "C" shape (side profile) in FIG. 1D to form a back side plate. A third side 55c is bent at a slight angle to form a bottom plate. Two additional side portions, side panel 28 and side panel 30, cap opposite ends of the first portion 55. Finally, the sixth side of the container our housing 60 is provided by a movable pressure plate 52. A handle 12 is attached to the pressure plate 52 by a hinge bracket 72. Side panels 28 and 30 are kept in place by tension rods 56a-56c which are threaded on their ends and tensioned with nuts 42. Wheels 44 are attached to the container or housing 60.

It is noteworthy that the first side portion 55 may be made of a plurality of pieces and that at one end it contains a ridge 40 on portion 55b that follows the contour of side panel 28 and side panel 30, so as to attach tension springs 62 and 64. The ridge 40 also limits the upward or backward travel of pressure plate 52 so that when the pressure plate is pulled as far back as possible by the tension of spring 62 and spring 64 it is limited to only a small opening between portion 55A and the lip of pressure plate 52

Traditionally, the container or housing 60 may be made of, for example, a metal and or plastic. In one case, the first side portion 55 and pressure plate 52 may be made of an anodized metal and side panel 28 and side panel may be made of plastic so as to deter corrosion from the mastic or mud. In the alternative the pressure plate 52 may be made of stainless steel.

Figure 2:
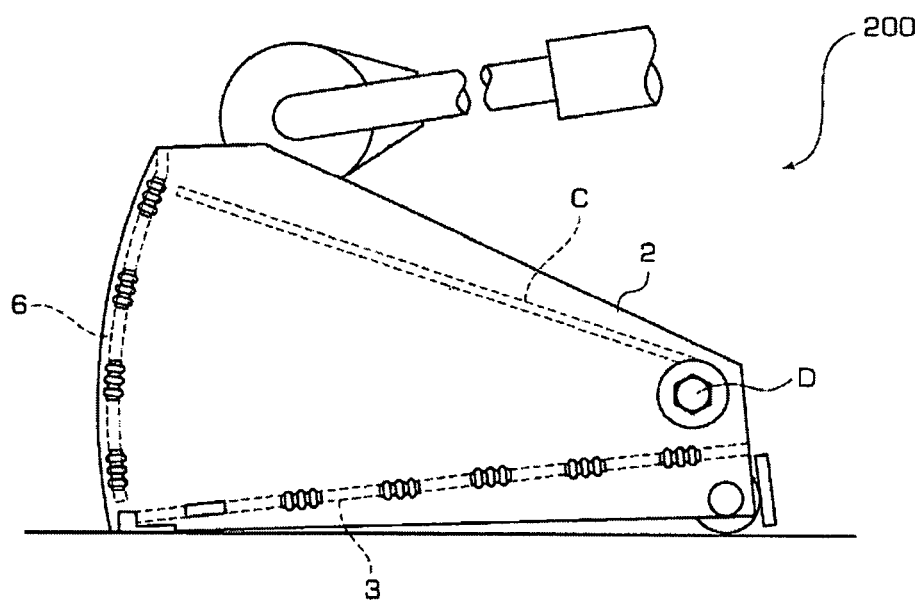
FIG. 2 illustrates a second traditional flat box construction.

Referring to FIG. 2, another typical construction of, for example, a corner or angle applicator box 200 is shown. In this case, the sides are held together using lateral extending members 4 and 7 from an acute shaped front wall 6 that is receive by openings 5 in side wall 2. The lateral extending members may be flared or widened at its outer most edge so that the side wall 2 is mounted securely to front wall 6. Further, in this case the pressure plate or mastic pressing plate C is pivotally mounted with a later shaft D located between parallel side walls 1 (opposite 2) and 2. Again the side wall materials may be an anodized metal and/or a plastic to resist corrosion.

Figure 3A:
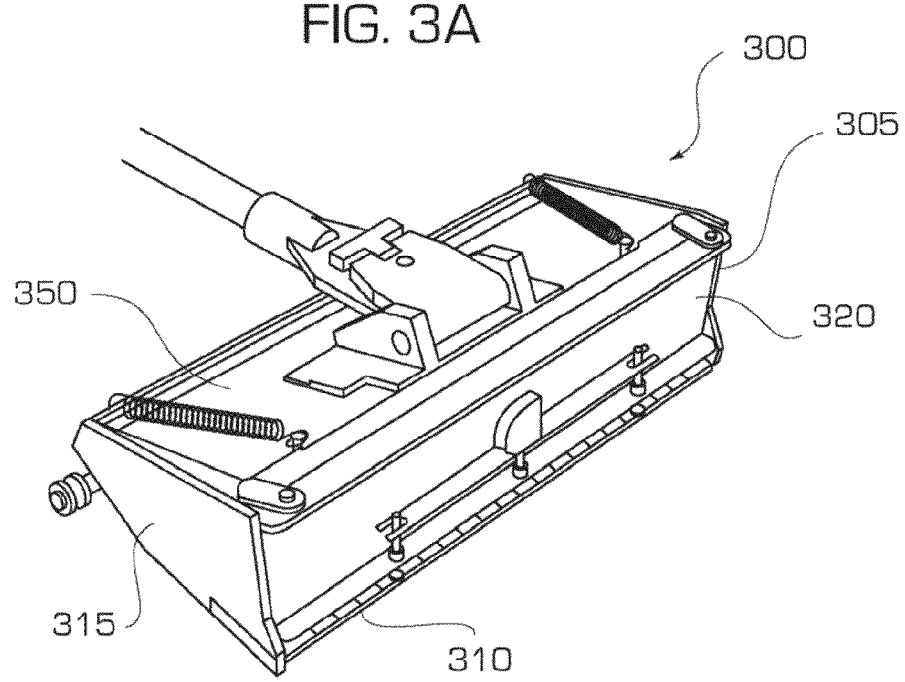
FIGS. 3A and 3B are perspective views of an exemplary flat box or applicator, according to one embodiment of the invention.
Figure 3B:
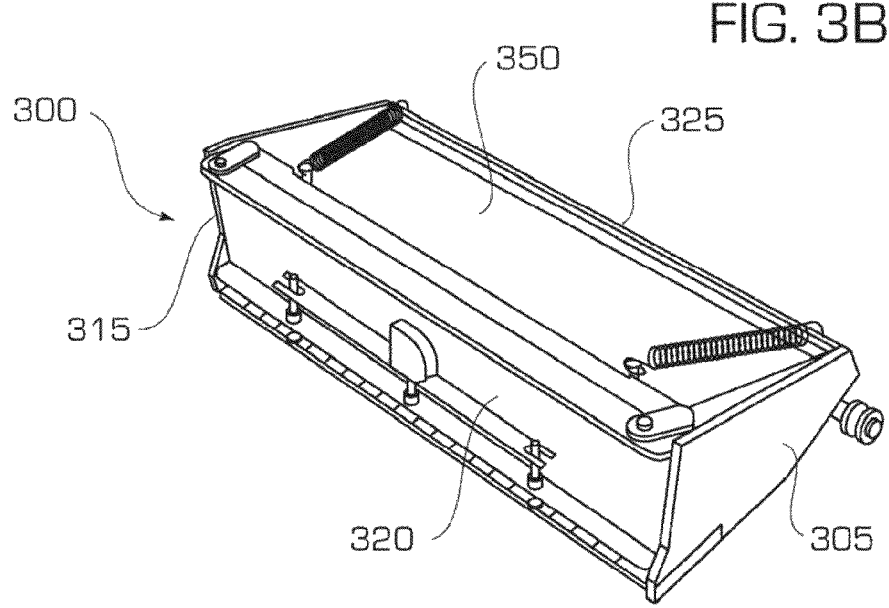
Figure 4:
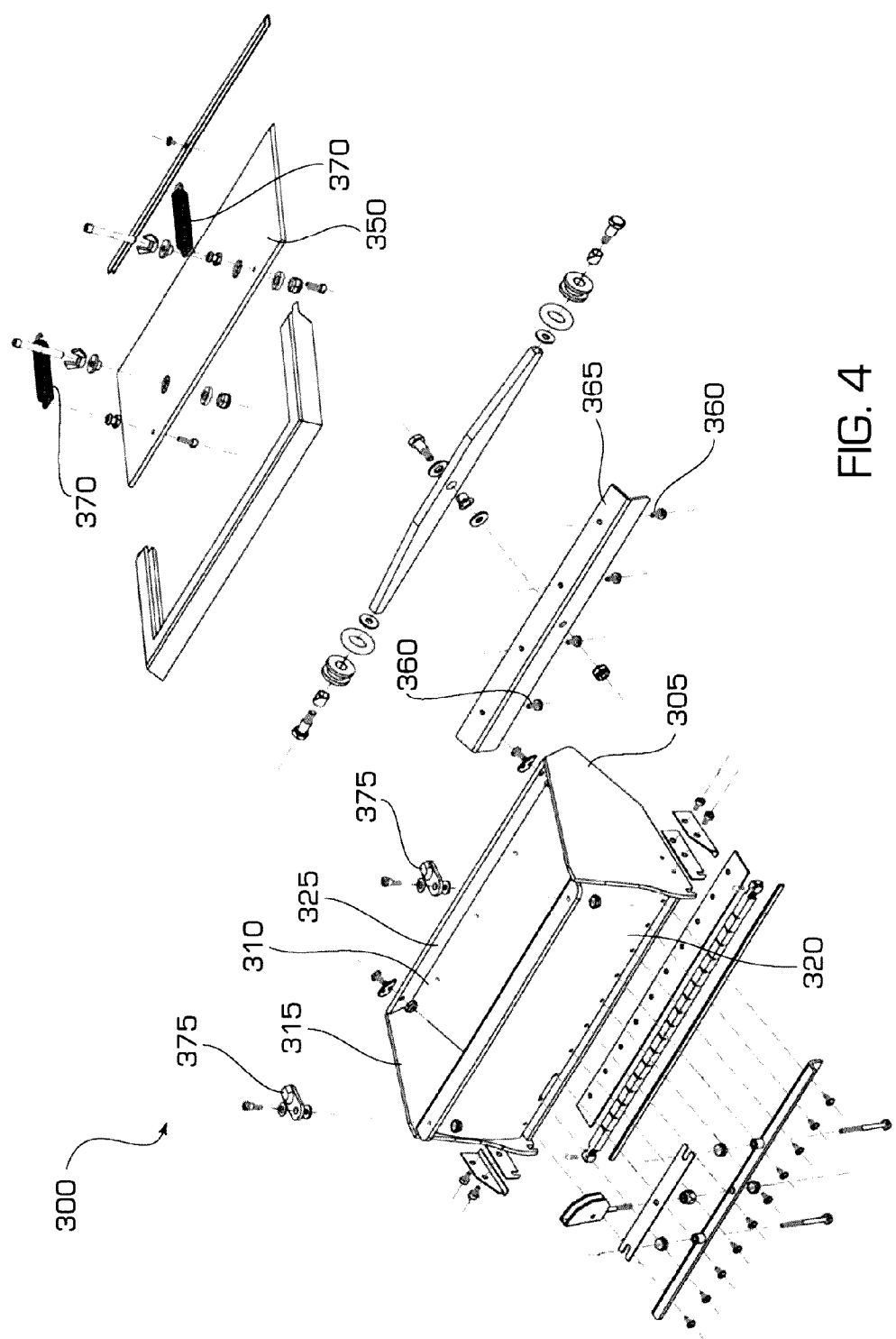
FIG. 4 is a detailed assembly drawing for the exemplary flat box or applicator of FIGS. 3A and 3B, according to one embodiment of the invention.

Referring now to FIGS. 3A, 3B, and 4, an exemplary flat box or applicator 300 according to one embodiment of the invention will now be described. In this case, at least four of the five side walls of the flat box or applicator are formed together as an integral piece. For example, side walls 305, 310, 315, and 320 may be made into a single integrated piece by, for example, casting or molding the parts together using a casting or molding process. Subsequently, a back plate side wall 325 may be attached to side walls 305, 310, and 315 by, for example, welding. In one variation, all of side walls 305, 310, 315, 320, and 325 may be formed together in an integral piece with side wall 325 being a linear extension of side wall 310. Again, a molding process may be used to form the integral piece. Subsequently, side 325 maybe bent up to be slightly more than parallel with side wall 320 and welded on its ends to side walls 305 and 315. This may help to reduce manufacturing cost and increase the structural durability of the tool. Of course, two or more side walls may be made integral with one another.

The flat box or applicator 300 may also include a movable pressure or pressing plate 350 placed in an opening formed between side walls 305, 315, 320 and back plate side wall 325. The movable pressure plate 350 provides a mechanism for pushing mastic or mud place in the container out an output hole formed in lower or bottom side wall 310 of the container or housing, so as to apply the mastic or mud in a controlled manner to a building surface.

The material of the side walls 305, 310, 315, 320, 325 and pressure plate 350 may be, for example, a metal or plastic. In one variation, the flat box or applicator 300 housing or container walls 305, 310, 315, 320, 325 and pressure plate 350 may be made, at least in part, using a light weight material including aluminum or magnesium to reduce the weight. For a flat box housing or container made of a material including magnesium, the material may be for example a magnesium alloy such as AZ31C containing approximately the following approximate percentages of materials: Magnesium: Aluminum (Al) at 2.5-3.5%; Copper (Cu) at 0.05% max; Iron (Fe) at 0.005% max; Manganese (Mn) at 0.20% min; Nickel (Ni) at 0.005% max; Silicon (Si) at 0.30% max; Zinc (Zn) at 0.60-1.40%; Calcium (Ca) at 0.30% max; OT (other) at 0.30% max; and Magnesium (Mg) is the remainder %. This composition or alloy of Magnesium may be particularly useful for forming parts by extrusion. Further, the formulation may have variations from those above, for example, the composition of magnesium may vary within the above by +/−5% for Al and Mg, and +5% on Mn. Another useful magnesium compound or alloy, may include the following substances in the following amounts: Aluminum (Al) at 8.5% to 9.5%; Copper (Cu) at 0.25% maximum; Manganese (Mn) at 0.15% minimum; Nickel (Ni) at 0.01% maximum; Silicon (Si) at 0.20% maximum; Zinc (Zn) at 0.45% to 0.9%; other materials (OT) at 0.30% maximum; and Magnesium (Mg) is the % remainder. This composition of Magnesium may be particular good for forming parts by casting. Further, other formulations are possible, such as the formulation of the magnesium alloy may vary within the above by +/−5% for Al and Mg, and +5% on Mn. In any case, the magnesium alloy does tend to be lighter in weight than an aluminum alloy, thus the magnesium may be particularly useful for making higher capacity flat boxes, without having too heavy a tool for the user when loaded with mastic or mud.

Further, the side walls 305, 310, 315, 320, 325, and pressure plate 350 may be covered with one or more protective coatings for protecting various metals against corrosion, for example, using a high impact coating such as paint covered with a clear coat of lacquer. In one example, the side walls and pressure plate 350 may be formed, powder coat with a liquid high-impact spray paint, then clear coated with high impact coating. One detailed coating method may be as follows using paints and lacquer finishes typically used to paint and seal the body parts of a motor vehicle:
 1. Clean the surface
 2. Sand blast all surfaces to create slight porosity on surface for paint adhesion
 3. Blow dust and residue off casting. Remove any excess residue with clean cloth
 4. Wet spray paint (special metal paint)
 5. Bake 1 hour at 120 degree C.
 6. Cool flat boxes to room temperature
 7. Paint with wet clear coat paint specially designed to seal colored painted surface.
 8. Bake 1 hour at 120 degree C.
 9. Cool These surface treatment methods will help seal and resist corrosion from the mastic or mud used in the flat box 300 for working on drywall or other surfaces.

In one variation, the back plate side wall 325 may be made as a single flat plate having a relatively short width or height from bottom side wall 310, so as to allow the movable pressure plate 350 to open sufficiently wide with respect to the housing to allow residual mastic or mud to be removed from the inside of the housing or container (i.e., to easily clean out residual mastic or mud after use) without the need for removing the pressure plate or removing various sides of the container or housing. As compared with the flat box show in FIGS. 1A-1C, the present invention may not have an additional length 40 on the back plate side wall 325 and the pressure plate 350 may therefore open wider for cleaning. This supports cleaning of the single integrated wall design for the flat box 300 that may not be taken apart as a result of its design. In an embodiment, two screws 360 may be placed through the side wall 310 as shown in FIG. 4 such that the ends of the screws 360 protrude from the interior of wall 310 sufficiently to stop outward movement of the movable pressure plate 350 upon the movable pressure plate 350 reaching an open position responsive to springs 370. The springs 370 may be biased to urge the movable pressure plate 350 to the open position. In an embodiment, the movable pressure plate 350 may be maintained in a closed position by clips 375. The screws 360 acting in cooperation with the springs 370 may thereby prevent the movable pressure plate 350 from becoming detached from the housing or container while in the open position. The screws 360 may also operate to secure a wheel assembly mounting bracket 365 to the housing or container. Therefore, in this embodiment, the flat box or applicator 300 may include a housing or container for holding mastic or mud that may be formed in most part from a single molded metal or plastic container including side walls 305, 310, 315, 320, and possibly back plate 325, and a pressure plate 350 included therewith.

One variation of the manufacturing process for making an applicator box may be as follows. Cast or mold the aluminum or magnesium boxes, weld in the back plate, powder coat, and then clear coat with high impact coating. From there the applicator boxes may be drilled and tapped to add the other parts.

Figure 5:
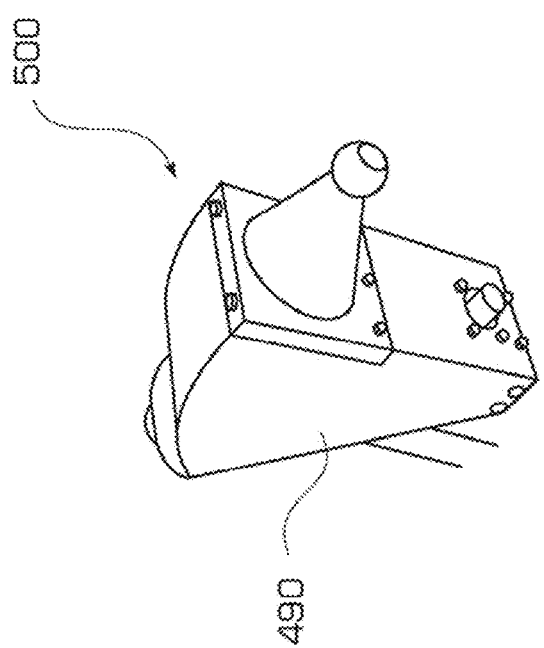
FIG. 5 illustrates a perspective view of an exemplary corner or angle applicator box, according to one embodiment of the invention.
Figure 6:
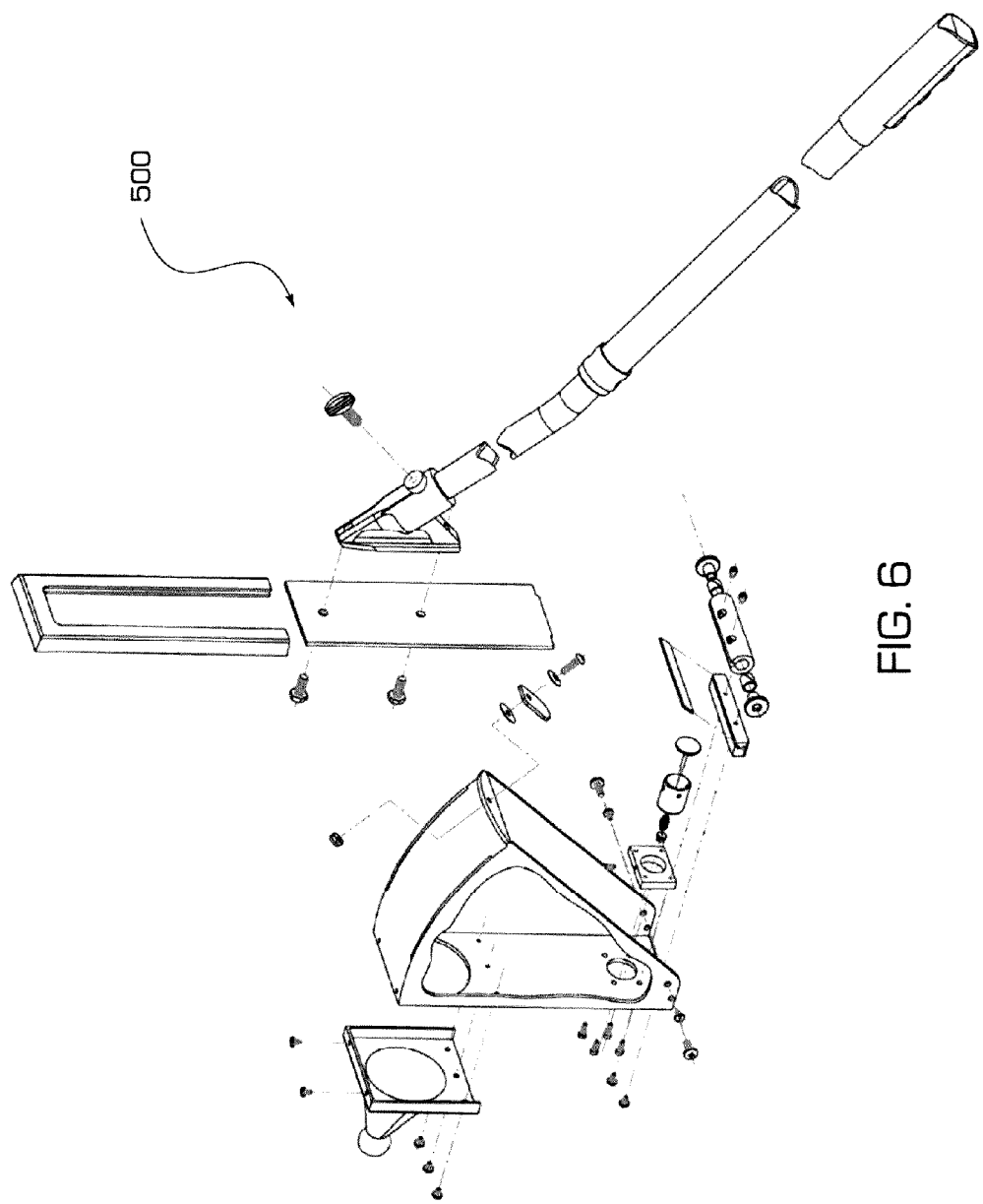
FIG. 6 depicts a first detailed assembly drawing for the exemplary corner or angle applicator box of FIG. 5, according to one embodiment of the invention.
Figure 7:
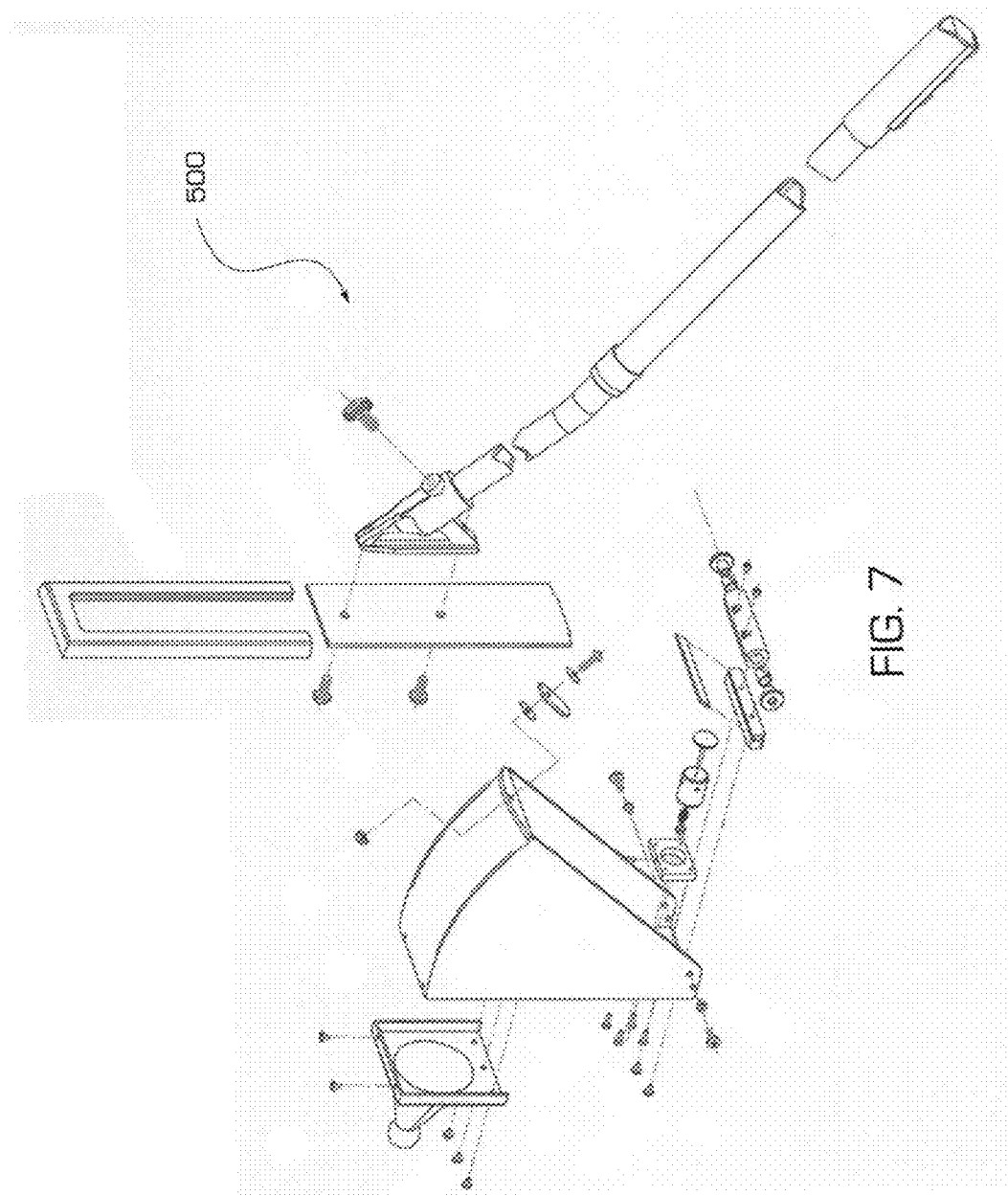
FIG. 7 depicts a second detailed assembly drawing for the exemplary corner or angle applicator box of FIG. 5, according to one embodiment of the invention.

In another embodiment, shown in FIGS. 5, 6, and 7, an angle or corner applicator box 500 may include a housing or container 490 for holding mastic or mud and may be formed, in most part, from a single molded metal container. A movable pressure plate 491 may be placed in a first opening of the housing or container so as to provide a mechanism for pushing mastic or mud place in the container out an output hole or opening of the container or housing 490 that may be capped by a cone 413 so as to apply the mastic or mud in a controlled manner to a building surface. The movable pressure plate 491 may be attached to the housing or container 490 via a shaft 410. The housing or container and/or various other parts of the angle or corner applicator 500 may be made of a metal including, for example, aluminum so as to make angle or corner applicator 500 light weight. In one variation, the housing or container 490 and/or various other parts of the angle or corner applicator 500 may be coated with a high impact coating and/or a lacquer, for example a high impact lacquer paint as shown in the previous embodiment, so as to provide a corrosion resistant coating. In another variation, the housing or container 490, pressure plate 491, and/or various other parts of the angle or corner applicator may be made of metal including, for example, magnesium so as to make the angle or corner applicator 500 even lighter weight. In such embodiments, the housing or container 490, pressure plate 491, and/or various other parts of the angle or corner applicator may be made using one of the magnesium alloys described hereinabove. In this case, larger housings or containers having a higher volume capacity may be made without becoming too heavy for a typical user or tradesman. Of course, various portions or parts of the angle or corner applicator may be made of a plastic material.

Figure 8:
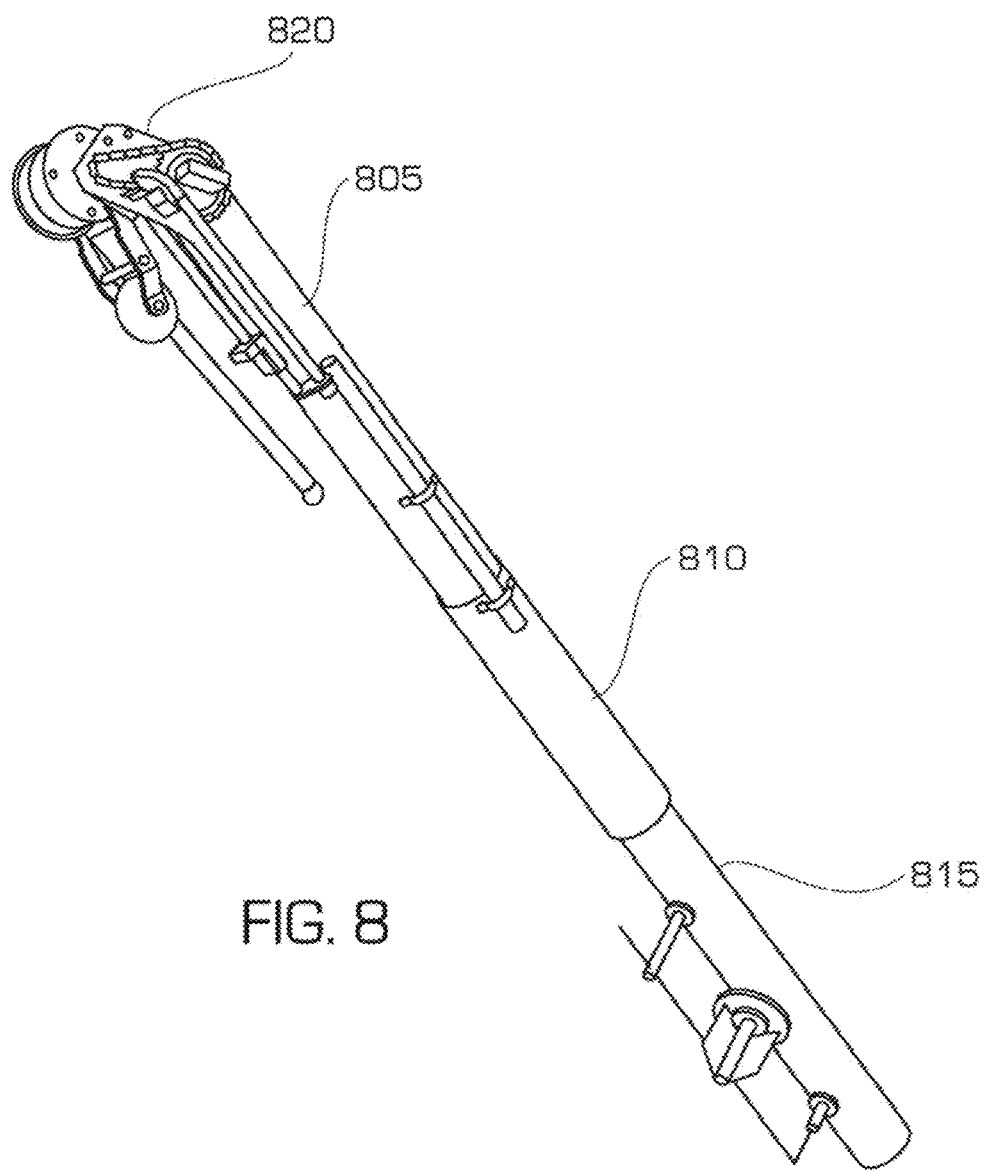
FIG. 8 depicts a perspective view of an exemplary automatic taper, according to one embodiment of the invention.
Figure 9A:
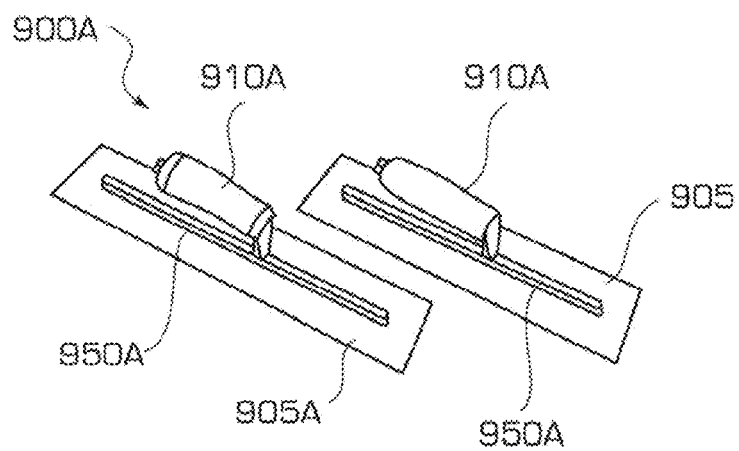
FIGS. 9A-9C depicts a number of exemplary trowels, according to one embodiment of the invention.
Figure 9B:
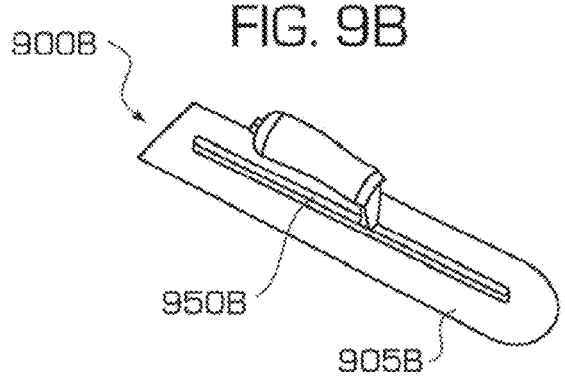
Figure 9C:
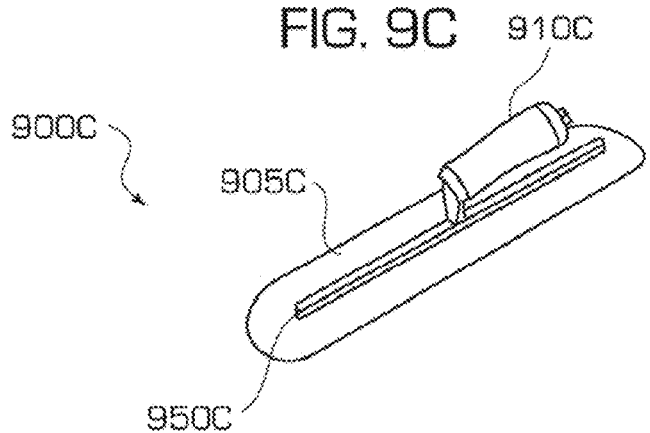

In a further embodiment shown in FIG. 8, an automatic taper 805 may include a shaft 815 including a control tube portion 810 and a tape application and cutting mechanism 820 attached to an end of the shaft 815 and responsive to the control tube 810. In an embodiment, the control tube 810 may be coated with a high impact coating and/or a lacquer, for example a high impact lacquer paint, so as to provide a corrosion resistant coating. This high impact coating may be similar to the high impact coating described above. In tool operation, the control tube is used for cutting and advancing tape for drywall taping.

In a further embodiment shown in FIGS. 9A-9C and 10, a trowel 900 may include a tang, support member or attachment member 950 that may be made, at least in part, of a material including magnesium so as to create a more light weight trowel. The material including magnesium may be magnesium alloy. For example, a magnesium alloy such as AZ31C containing approximately the following approximate percentages of materials: Magnesium: Al: 2.5-3.5%; Cu: 0.05% max; Fe 0.005% max; Mn 0.20% min; Ni 0.005% max; Si 0.30% max; Zn 0.60-1.40%; Ca 0.30% max; OT 0.30% max; Mg the remainder %. This composition or alloy of Magnesium may be particularly useful for forming parts by extrusion. Further, the formulation may have variations from those above, for example, the composition of magnesium may vary within the above by +/−5% for Al and Mg, and +5% on Mn. Another useful magnesium compound or alloy, may include the following substances in the following amounts: Aluminum (Al) at 8.5% to 9.5%; Copper (Cu) at 0.25% maximum; Manganese (Mn) at 0.15% minimum; Nickel (Ni) at 0.01% maximum; Silicon (Si) at 0.20% maximum; Zinc (Zn) at 0.45% to 0.9%; other materials (OT) at 0.30% maximum; and Magnesium (Mg) is the % remainder. This composition of Magnesium may be particular good for forming parts by casting. Further, other formulations are possible, such as the formulation of the magnesium alloy may vary within the above by +/−5% for Al and Mg, and +5% on Mn. The tang, support member or attachment member 950 connects the trowel handle 910 (910A, 910B, 910C) to the trowel blade 905 (905A, 905B, 905C). The trowel 900 may be, for example, a concrete trowel including a cross-ground trowel 905A, a flat back end finishing trowel 905B, or a round/round finishing trowel 905C. The trowel blade 905 may be made of high carbon steel covered with a clear coat.

Referring to FIG. 10, the tang, support member or attachment member 950 includes an elongated member 951 that is coupled at its lower surface 952 to the trowel blade 905. A handle connecting member 953 may be included with the tang, support member, or attachment member 950, and may be coupled to and approximately perpendicular to the elongated member 951. A handle support member 954 may be included with the tang, support member, or attachment member 950, and may be attached to the handle connecting member 953 and approximately parallel with the elongated member 951. The elongated member 951, handle connecting member 953, and handle support member 954, may be part of an integral tang, support member, or attachment member 950 made of the same material or may be welded together and made of the same or different materials such as materials including steel and/or magnesium. Of course, a tang of lightweight magnesium alloy may be useful in coupling a blade and a handle for a variety of other tools.

Although a particular embodiment(s) of the present invention has been shown and described, it will be understood that it is not intended to limit the invention to the preferred embodiment(s) and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

All publications and patents cited herein are hereby incorporated by reference in their entirety for all purposes.

What is claimed is:

1. A mastic flat box applicator, comprising:
   a housing that has a lateral length from side-to-side greater than its height or width, including;
   an elongated front side wall;
   an elongated bottom side wall coupled to the front side wall at a first end;
   a left side wall coupled to the front side wall and bottom side wall;
   a right side wall opposite the left side wall and coupled to the front side wall and bottom side wall; and
   an elongated straight back plate opposite the front side wall and coupled to a second end of the bottom side wall at a bottom edge so as to form an approximately perpendicular corner or angle, the elongated straight back plate having a relatively short maximum width or height along a length of the elongated straight back plate compared to the height of the various side walls from where it is connected at the bottom edge to the bottom side wall;
   a movable plate disposed in an opening of the housing and abutting at one of its ends the corner or angle formed between the bottom side wall and the back plate as a pivot point and pivoting therein, without being fixedly attached thereto, so as to permit rotational movement of the movable plate about an axis in the corner or angle location;
   a plurality of springs coupled to the movable plate and housing so as to place tension on the movable plate and pull it backward toward the back plate;
   wherein the elongated straight back plate has a width or height dimension and the plurality of springs are coupled to the back plate and housing so as to allow the movable plate to open sufficiently wide with respect to the housing such that most if not all of any residual mastic or mud may be removed from the inside of the housing without the need for removing the movable plate or any side wall
   a means for preventing the movable plate, that is abutting at one of its ends the corner or angle formed between the bottom side wall and the back plate, from being removed from the housing and pivot point when the movable plate is in an open position in the housing; the means for preventing the movable plate, that is abutting at one of its ends the corner or angle formed between the bottom side wall and the back plate, from being removed from the housing and pivot point is a plurality of protrusions disposed in the bottom side wall at a distance sufficiently close to an inner edge of the movable plate at an axis of rotation so as to catch the inner edge of the movable plate and stop outward and rotational movement of the movable plate at an open position.

2. The mastic flat box applicator of claim 1, further comprising:
   at least one clip coupled to the elongated front side wall to maintain the movable plate in a closed position.

3. The mastic applicator of claim 1, wherein the plurality of protrusions are a plurality of screws screwed into the bottom side wall from the outside of the housing.

4. The mastic flat box applicator of claim 3, wherein at least one side wall of the housing is made of a material that includes aluminum.

5. The mastic flat box applicator of claim 1, wherein at least one side wall of the housing is made of a material that includes magnesium.

6. The mastic flat box applicator of claim 5, wherein the material is a magnesium alloy consisting of: aluminum at 2.5-3.5%; copper at 0.05% max; iron at 0.005% max; manganese at 0.20% min; nickel at 0.005% max; silicon at 0.30% max; zinc at 0.60-1.40%; calcium at 0.30% max; other materials at 0.30% max; and magnesium is the remainder %.

7. The mastic flat box applicator of claim 5, wherein the material is a magnesium alloy consisting of: aluminum at 8.5% to 9.5%; copper at 0.25% maximum; manganese at 0.15% minimum; nickel at 0.01% maximum; silicon at 0.20% maximum; zinc at 0.45% to 0.9%; other materials at 0.30% maximum; and magnesium is the % remainder.

8. The mastic flat box applicator of claim 5, wherein at least two side walls of the housing are made by extrusion of a material that is a magnesium alloy consisting of: aluminum at 8.5% to 9.5%; copper at 0.25% maximum; manganese at 0.15% minimum; nickel at 0.01% maximum; silicon at 0.20% maximum; zinc at 0.45% to 0.9%; other materials at 0.30% maximum; and magnesium is the % remainder, or consisting of: aluminum at 2.5-3.5%; copper at 0.05% max; iron at 0.005% max; manganese at 0.20% min; nickel at 0.005% max; silicon at 0.30% max; zinc at 0.60-1.40%;

calcium at 0.30% max; other materials at 0.30% max; and magnesium is the remainder %.

9. A mastic flat box applicator, comprising:
a housing that includes at least five walls, including a front wall, a bottom wall and a back plate wall that are longer than a left side wall and a right side wall;
a movable plate disposed in an opening formed by the five walls and abutting a corner or angle formed at a connection point of the bottom wall and the back plate so as to permit rotational movement of the movable plate about an axis of rotation occurring at the angled corner;
a means for preventing the movable plate, that is abutting at one of its ends the corner or angle formed between the bottom side wall and the back plate, from being removed from the housing and pivot point by stopping outward and rotational movement of the movable plate at an open position; and
an exit hole formed in one of the walls and through which mastic exiting the housing is controllably applied to a building surface in responsive to movement of the movable plate, and wherein the back plate is a flat plate having a maximum width or height dimension along a length of the back plate that allows the movable plate to open sufficiently wide with respect to the housing to allow an residual mastic or mud to be removed from an entire inside of the housing without the need for removing the movable plate or any side wall
wherein the means for preventing the movable plate from being removed from the housing and pivot point by stopping outward and rotational movement of the movable plate at an open position is one or more protrusions extending inward into the housing from the bottom wall.

10. The mastic applicator of claim 9, wherein the protrusions are a plurality of screws threaded shafts disposed in the bottom wall at a distance sufficiently close to an inner edge of the movable plate at the axis of rotation so as to catch the inner edge of the movable plate and stop outward and rotational movement of the movable plate at an open position.

11. The mastic flat box applicator of claim 9, wherein at least one of the walls and movable plate are covered with one or more protective coatings for protecting various metals against corrosion and the coating is a high impact coating.

12. The mastic flat box applicator of claim 11, in which the high impact coating is paint covered with a clear coat of lacquer.

13. The mastic flat box applicator of claim 9, further comprising:
a plurality of springs coupled to the movable plate and housing so as to place tension on the movable plate and pull it backward toward the back plate, wherein the back plate is a elongated straight back plate having a width or height dimension and the plurality of springs are coupled to the back plate and housing so as to allow the movable plate to open sufficiently wide with respect to the housing such that residual mastic or mud may be removed from the inside of the housing without the need for removing the movable plate or any side wall.

14. The mastic flat box applicator of claim 9,
wherein the back plate is an elongated straight back plate opposite the front side wall and coupled to a second end of the bottom side wall at a bottom edge so as to form an approximately perpendicular corner or angle, the single flat straight back plate having a relatively short width or height compared to the height of the various side walls from where it is connected at the bottom edge to the bottom side wall.

15. A mastic flat box applicator, comprising:
an applicator housing that is made of a material including a magnesium alloy or aluminum alloy, the housing having a plurality of walls including at least:
a bottom side wall; and
a back plate side wall coupled to the bottom side wall; and
a movable plate disposed in an opening of the housing and abutting at one of its ends the corner or angle formed between the bottom side wall and the back plate as a pivot point and pivoting therein, without being fixedly attached thereto, so as to permit rotational movement of the movable plate about an axis in the corner or angle location;
wherein one of the walls includes an exit hole through which mastic exits the housing responsive to movement of the movable plate, and the back plate side wall includes at least a flat plate having a single width or height dimension along an entire length of the back plate side wall so as to allow the movable plate to open sufficiently wide with respect to the housing to allow residual mastic or mud to be removed from the inside of the housing to clean an entire inside of the housing of the residual mastic or mud without the need for removing the movable plate or any wall
a means for preventing the movable plate, that is abutting at one of its ends the corner or angle formed between the bottom side wall and the back plate, from being removed from the housing and pivot point by stopping outward and rotational movement of the movable plate at an open position.

16. The mastic flat box applicator of claim 15, further comprising:
a plurality of springs coupled to the moveable plate and the back plate;
and
at least one wheel coupled to the housing.

17. The mastic flat box applicator of claim 15, wherein the material is a magnesium alloy consisting of: aluminum at 2.5-3.5%; copper at 0.05% max; iron at 0.005% max; manganese at 0.20% min; nickel at 0.005% max; silicon at 0.30% max; zinc at 0.60-1.40%; calcium at 0.30% max; other materials at 0.30% max; and magnesium is the remainder %.

18. The mastic flat box applicator of claim 15, wherein the material is a magnesium alloy consisting of: aluminum at 8.5% to 9.5%; copper at 0.25% maximum;
manganese at 0.15% minimum; nickel at 0.01% maximum; silicon at 0.20% maximum; zinc at 0.45% to 0.9%; other materials at 0.30% maximum; and magnesium is the % remainder.

* * * * *